L. L. BRODER.
TRACTOR.
APPLICATION FILED AUG. 5, 1919.

1,369,778.

Patented Mar. 1, 1921.
2 SHEETS—SHEET 1.

Inventor
Lloyd L. Broder.
By
Attorney

L. L. BRODER.
TRACTOR.
APPLICATION FILED AUG. 5, 1919.
1,369,778.
Patented Mar. 1, 1921.
2 SHEETS—SHEET 2.
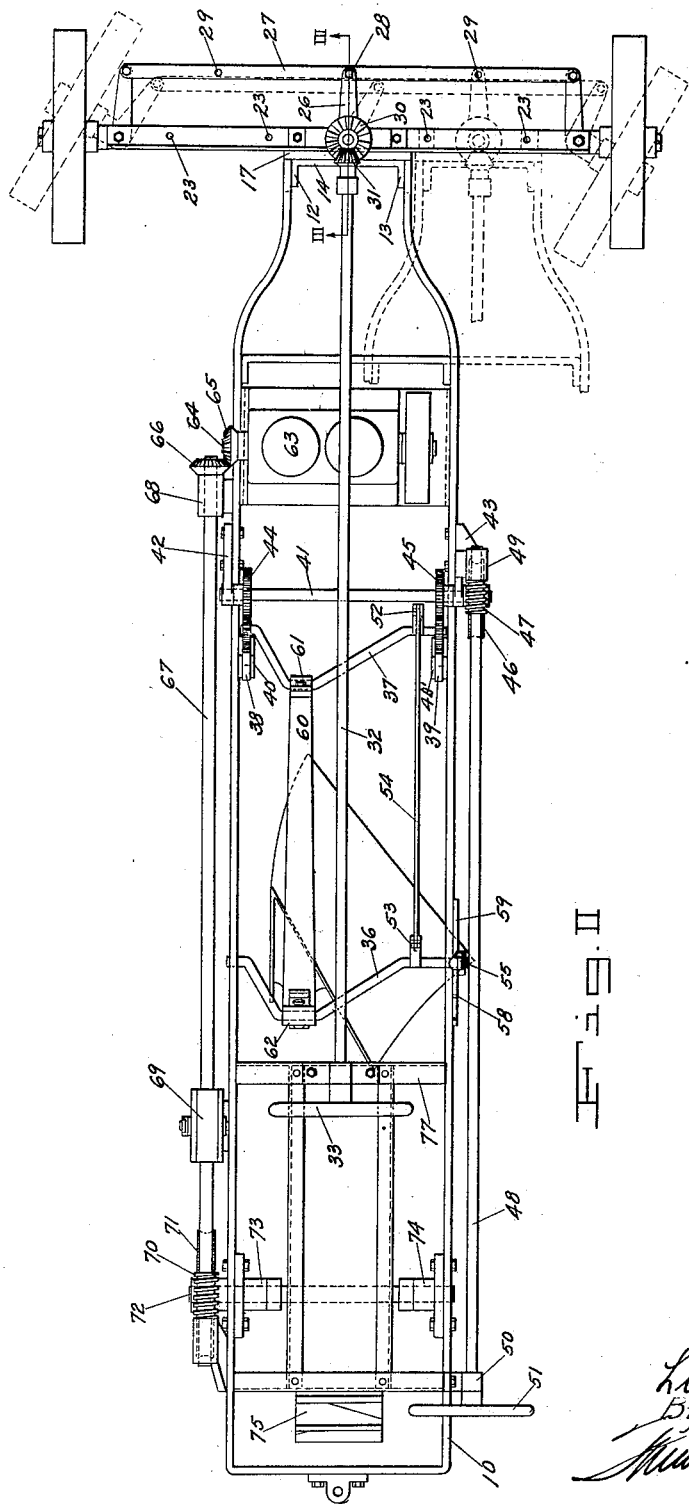
Fig. II
Inventor
Lloyd L. Broder,
By
Attorney

UNITED STATES PATENT OFFICE.

LLOYD L. BRODER, OF EUGENE, OREGON, ASSIGNOR TO AMERICAN UNIVERSAL IMPLEMENT COMPANY, A CORPORATION OF OREGON.

TRACTOR.

1,369,778.           Specification of Letters Patent.      Patented Mar. 1, 1921.

Application filed August 5, 1919. Serial No. 315,496.

*To all whom it may concern:*

Be it known that I, LLOYD L. BRODER, a citizen of the United States of America, and resident of Eugene, in the county of Lane and State of Oregon, have invented certain new and useful Improvements in Tractors, of which the following is a specification.

This invention relates to tractors and particularly to tractors designed for use in farming as for operating cultivators, potato diggers and other farm machinery, the said invention having for its object the provision of novel means whereby the traction wheel or bull wheel will operate or run in a furrow formed by the plow.

Furthermore, an object of this invention is to provide novel means whereby the blades (which term will hereafter be used to denote the plow shovels or other implements which are designed for cultivating or cutting) and their attachments may be elevated or lowered by simple mechanism and furthermore, whereby the depth of operation of the points of the blades may be adjusted with relation to other parts thereof.

Furthermore, an object of this invention is to provide novel means whereby the draft or position of the frame of the apparatus may be changed transversely of the axle while providing means for steering the mechanism.

A still further object of this invention is to provide a frame having transverse oscillatory motion with respect to the front axle, thus allowing movement which will compensate for unevenness of the surface over which the tractor is passing and permitting raising or lowering of the wheel on either side of the frame without materially interfering with the position of the blades.

A still further object of the invention is to provide a tractor having a wheel provided with means whereby soil deposits may be readily dislodged while the said wheel is rotating.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Fig. 2 illustrates a plan view thereof;

Figure 1:
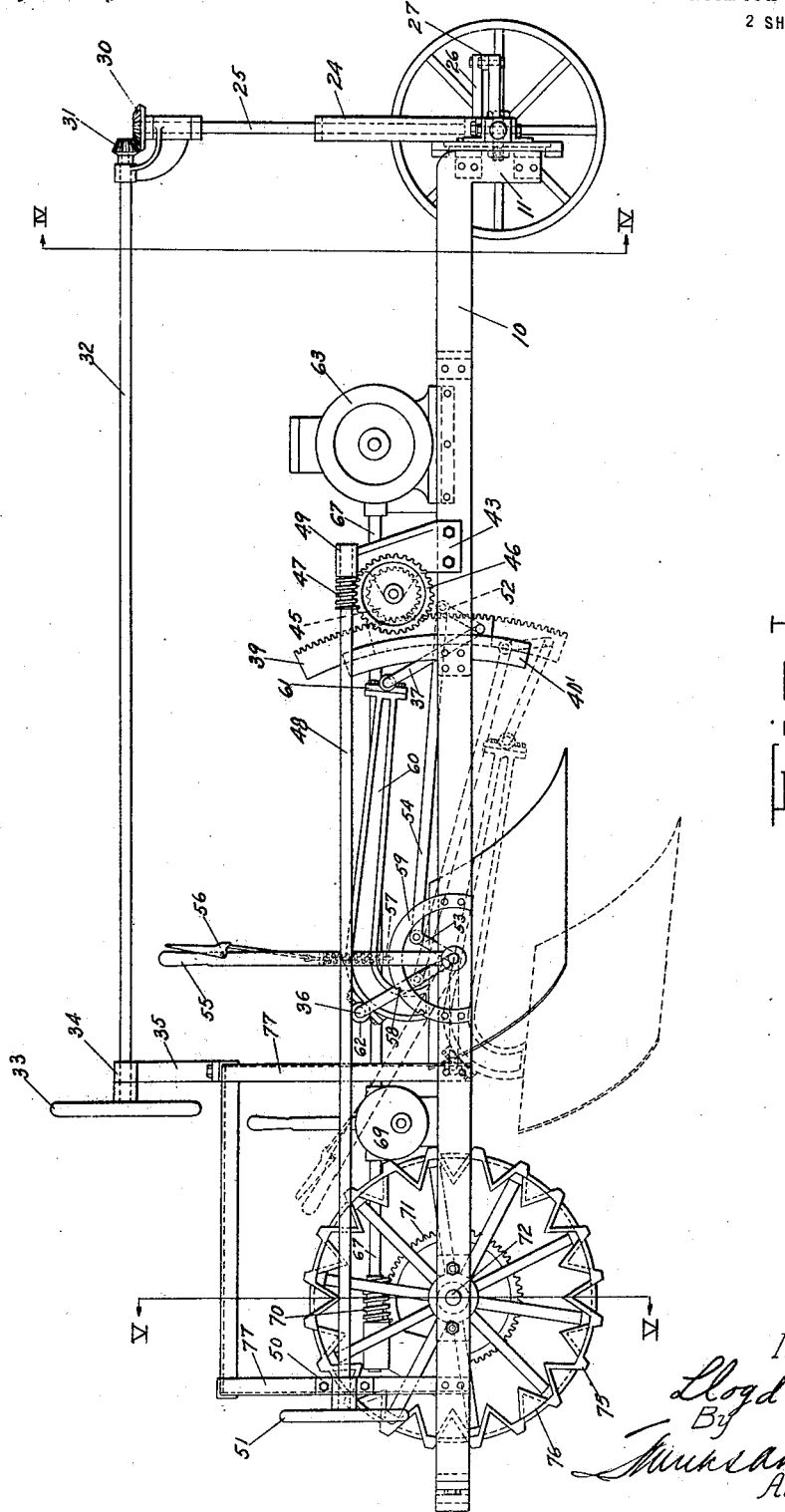
Figure 1 illustrates a view in elevation of a tractor embodying the invention.

In these drawings 10 denotes a frame which is substantially rectangular in plan except that the front ends of the frame converge slightly and at their forward ends the said frames have downwardly projecting extremities 11 forming an anchorage to which the flanges 12 and 13 of plates 14 and 15 respectively are secured. The said plates are secured to a head 16 which is held in place by a guide 17 and the said head has a pivot bolt 19 extending through it, the said pivot bolt extending through a member 20 and with relation to which the frame oscillates transversely.

The front axle comprises two parallel separated bars 21 and 22 with relation to which the frame is slidable and the bar 21 has a series of apertures 23 so that the frame may be attached at different positions of adjustment with relation to the said axle as shown in dotted lines in Fig. 2. The upper member of the axle supports a standard 24 in which a shaft 25 is rotatable, the lower end of said shaft having an arm 26 projecting therefrom and connected to the steering rod 27 by fastenings such as 28. The steering rod has a series of apertures 29 so that the steering rod can be secured at different positions of adjustment, as shown in Fig. 2, either to the right or left hand side of the center for the purpose of steering the front truck of the tractor, all of which is shown in dotted lines in Fig. 2.

The upper end of the shaft 25 has a gear wheel 30 which engages with the gear wheel 31 of the steering shaft 32 and the steering shaft has an operating wheel 33 which may be within convenient reach of an operator. The rear section of the steering shaft is journaled in a bearing 34 on the standard 35.

A crank 36 is journaled in the sides of the frame and a crank 37 has its ends journaled in segmental racks 38 and 39 which racks are slidable in guides 40 and 40' respectively, carried by the sides of the frames preferably in front of the crank 36.

A shaft 41 is journaled in standards 42 and 43 secured to the frame and the said shaft has a pinion 44 meshing with the rack 38 and a pinion 45 meshing with the teeth of the rack 39, so that as the shaft 41 is rotated, and according to the direction of rotation, the segmental racks are elevated or lowered as shown in dotted lines, Fig. 1.

As a means for rotating the shaft 41, a worm wheel 46 is mounted on the said shaft and the said worm wheel is engaged by a worm 47 on the shaft 48. The forward end of the shaft 48 is journaled in a bearing 49 on the standard 43 and the rear portion of said shaft 48 is journaled in a bearing 50, said shaft being provided with an operating wheel 51 by which the shaft is turned for the purpose of adjusting the segmental racks and the height of the pivots of the crank 37.

The crank 37 has an arm 52 carried on it and the crank 36 has an arm 53, the said arms being connected by a link 54, the ends of which are pivotally connected to the arms so that the said cranks are rotated in unison when the crank 36 is rotated by the operating handle 55 which is mounted on the said crank preferably outside of the frame. The operating handle 55 has a detent operating means 56 so that the detent 57 may be caused to engage or enter the notch 58 of the quadrant 59 which is also secured to the frame.

The cranks 36 and 37 constitute supports or connections for a plow beam 60, the forward end of the said plow beam having a clip 61 bolted to it, the said clip embracing the crank 37. The plow beam 60 near its rear end has a clip 62 attached to it, which clip couples the crank 36 to the said beam so that as the cranks are rotated, they raise or lower the beam according to the direction of rotation of the said cranks.

The height of the plow beam at the forward end is controlled by means of the toothed segments heretofore described so that by this adjustment, the front or points of the plow shovels or shares may be tilted to insure their proper operation.

A motor 63 of any appropriate type may be mounted on the frame and the drive shaft 64 thereof may have a gear wheel 65 meshing with a gear wheel 66 on the shaft 67, which shaft 67 is journaled in bearings 68. The transmission 69 is of standard type.

Near the rear end of the shaft 67 the worm 70 is mounted and the said worm meshes with a worm wheel 71 on the rear axle 72 which axle is journaled in bearings 73 and 74 attached to the sides of the frame. The rear axle or shaft has a traction or bull wheel 75 and the face of the said wheel has V-shaped grooves 76 between the lugs, the said grooves alternately tapering to opposite sides of edges of said wheel and this provision insures greater traction and prevents fouling for the reason that deposits are caused to dislodge or work out on the sides of the wheel.

The bearing 50 and the standard 35 are secured on to a sub frame 77 rising from the frame 10 and are supported thereon.

It is to be understood of course that earth working elements of different types may be suspended from the cranks, that is to say, they may comprise the ordinary gang plow or cultivator or harrow, and the inventor does not wish to be limited with respect to these features.

As a description of the functions of the elements has been given and the relation of the elements to one another has been stated in connection with the descriptions of the elements themselves, a resumé of the operations or functions of the device is believed unnecessary to an understanding of the invention by those skilled in the art.

I claim—

In a tractor, a frame, guides thereon, racks slidable therein, toothed wheels engaging the teeth of the segments, means for rotatably supporting the toothed wheels in operative relation to the segments, means for rotating the wheels, a beam support journaled in the toothed segments, means for connecting the beam support to a beam, a second beam support journaled in the frame, means for connecting the said second beam support to the beam, means for rotating the last mentioned beam support, and means for communicating the motion of one beam support to the other beam support.

LLOYD L. BRODER.